3,764,495
REMOVAL OF MERCURY FROM CAUSTIC SOLUTIONS
Joel P. Guptill, Syracuse, and Gary W. Foley, Camillus, N.Y., assignors to Allied Chemical Corporation, New York, N.Y.
Filed Apr. 21, 1971, Ser. No. 135,971
Int. Cl. C01d *1/08;* B01d *19/00, 47/00*
U.S. Cl. 204—99                  16 Claims

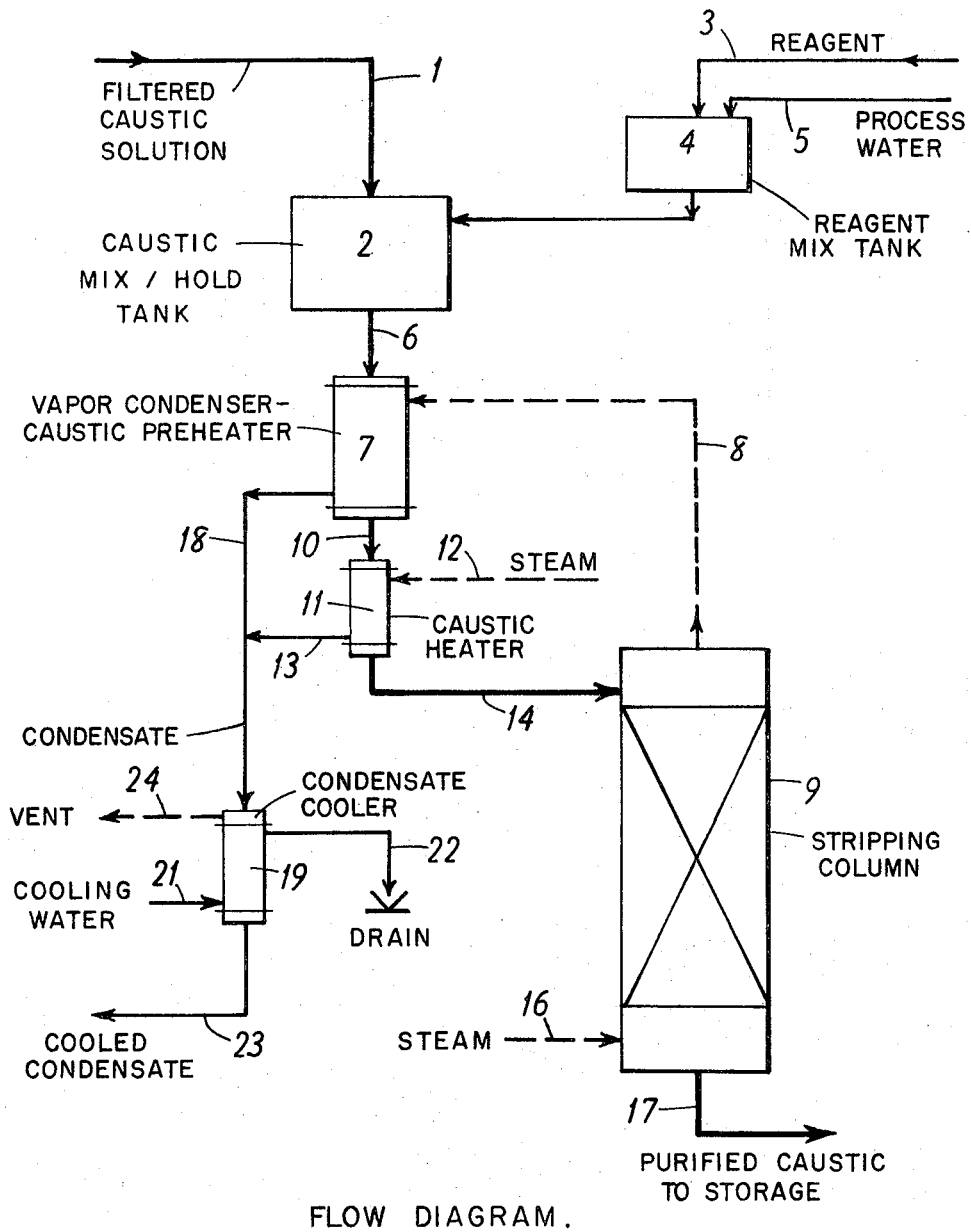
FLOW DIAGRAM.
MERCURY REMOVAL FROM CAUSTIC SOLUTIONS.
INVENTORS
JOEL P. GUPTILL
GARY W. FOLEY
BY
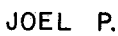
AGENT United States Patent Office 3,764,495
Patented Oct. 9, 1973

ABSTRACT OF THE DISCLOSURE

A method for removing mercury from a mercury cell caustic soda or caustic potash solution wherein a vapor or gas is passed through the solution in the presence of a small amount of a reducing agent. Caustic solutions are obtained containing as low a concentration of mercury as 0.01 part per million. Special means are provided for recovery of the mercury.

---

This invention relates to a method for the removal of contaminating mercury from solutions of caustic soda or caustic potash, manufactured by the electrolysis of aqueous solutions of their respective chlorides, in electrolytic cells employing mercury cathodes.

The concentration of caustic soda and caustic potash solutions obtained in the mercury cell process for the production of caustic soda, caustic potash and chlorine, usually runs about 50% by weight in the case of the soda solution and about 45% in the case of the potash solution. In normal plant operation a small percent of the metallic mercury is lost as it becomes entrained, or it becomes oxidized or reacted to the ionic state. This trace of mercury commonly appears as a contaminant in both the caustic soda and caustic potash solutions prepared by the mercury cell electrolytic process. This mercury contamination is obviously objectionable in most chemical processes and preparations involving caustic soda. It is particularly objectionable to customers using the caustic soda or caustic potash in the manufacture of chemicals to be used in the photographic industry.

The presence of metallic mercury in the caustic solutions produced in electrolytic cells using mercury cathodes has long been recognized by the producers of caustic soda and potash by this route. Usually settling, coalescing, filtration, absorption or a combination of these steps, is recommended for its removal.

In the past, several rather specific methods have been employed to remove and sometimes recover this mercury but most of these methods fail to reduce the mercury contaminant sufficiently. Furthermore, they involve the use of additional and often costly equipment.

U.S. Pat. 2,885,282 teaches the use of aldehydes to reduce the soluble mercury compounds contained in the dechlorinated brine effluent from mercury cathode electrolytic cells, to metallic mercury. The mixture then is passed to a "settler or other classification equipment" in an effort to have the mercury settle out.

U.S. Pat. 3,039,865 also deals with the recovery of mercury from spent aqueous electrolytic cell brines. The process is carried out by intimately contacting substantially water-stable, solid, metallic reducing agents, such as iron or zinc. These metals reduce the ionic mercury contained in the solution to the elemental form, which then deposits on the surface of the metal to form an amalgam.

U.S. Pat. 3,502,434 is directed specifically toward the removal of mercury from mercury cell caustic soda liquor. The mercury, as well as organic contaminants such as humic acid, which is sometimes present in the cell water, are removed by the expedient of permitting the cell liquor to pass in an upward direction through a composite bed of particulate material comprising shredded polymeric material, activated carbon or other carbonaceous material, and pieces of metal such as stainless steel, nickel or tantalum. In addition to the special equipment required, this method also has the disadvantage that the contaminating mercury is reduced only to about 0.1 p.p.m., as in the case of the process of the previously cited patent.

It has been found that volatilization of mercury takes place when a gas or vapor stream is made to flow through caustic solutions contaminated with this element. A substantial portion of the mercury is removed from the caustic solution by the carrier gas or vapor. It is theorized that this mercury is in the elemental state. It has also been found that the concentration of mercury in solution reaches a level beyond which substantially no further reduction occurs, even when additional gas or vapor is passed through the caustic solution. It is theorized that the residual mercury atoms are in the charged or oxidized state. If, however, a reducing agent is added to the caustic solution, it has now been found that an additional quantity of mercury can be removed by the further passage of gas or vapor through the caustic solution. In other words, the level which could not be lowered substantially, regardless of the quantity of gas or vapor which was passed through a solution, is very definitely lowered by this same treatment when a reducing agent is added to the solution. This highly effective method of eliminating mercury, comprising the combination of the passage of gas or vapor through the solution with the addition of a reducing agent, has been found applicable to caustic potash solutions as well as to solutions of caustic soda. One way in which vapor can be passed through the solution is by boiling the solution, thereby forming water vapor in situ.

The nature of the equipment in which the process is carried out is not material to the functioning of the process, and furthermore, the process can be carried out either batchwise or continuously. Columns can be used, flooded or non-flooded, or the process can be carried out in a vat.

The more efficiently the heterogenous phases of gas or vapor and liquid come in contact, the more efficiently the mercury will be removed. The gas or vapor selected may be any that is not totally absorbed or condensed by the caustic solution at the particular temperature employed. Air, nitrogen, and preferably water vapor are examples of gases which can be used, but care should be taken to insure that the chosen gas or vapor introduces no impurities into the caustic solution. Although mercury may be removed from a caustic solution by the passage of gas or vapor through the solution at all temperatures at which the solution remains fluid, from a practical standpoint, the temperature at which the process is carried out is an important factor. At elevated temperatures, i.e. above 20° C., preferably between 50° C. and the boiling point of the solution, the rate of removal of the mercury is greatly accelerated. These relatively high temperatures are preferable as the viscosity of the caustic solution decreases, and the vapor pressure of mercury increases, with increase in temperature. For this reason, the expedient of passing steam through the solution, or of adding water and boiling the solution to produce the required water vapor in situ, is particularly effective.

The operation may be carried out under atmospheric, subatmospheric or super-atmospheric pressure, but we prefer to conduct the operation, for reasons of economy, at atmospheric, or at slight super or subatmospheric pressures.

It is a primary object of the present invention to provide a method constituting an inexpensive, simple and efficient means for removing mercury from caustic mercury cell liquors, and from dilute caustic solutions, which process comprises the passage of a gas or vapor through the solution in the presence of a reducing agent.

A further object of this invention is to provide a caustic solution obtained from mercury cell liquor, which contains less than about .01 to .05 p.p.m. of mercury. These and other objects will become apparent to those skilled in the art from the following description of the invention:

Mercury cell caustic liquor, as well as more dilute caustic solutions contaminated with mercury, are treated with about .01% to 0.2% of a reducing agent such as stannous chloride dihydrate, sodium or potassium sulphite, sodium or potassium thiosulfate, sodium or potassium hypophosphite, hydroxylamine hydrochloride or an equal amount of an organic reducing agent such as hydroquinone, ascorbic acid, triethanolamine, formaldehyde or sucrose. A gas such as nitrogen or air can be passed through the solution, or alternately and preferably, an amount of water equal to about 5–100% of the weight of the caustic solution can be added, and then boiled out of the solution, thus providing for the passage of water vapor through the solution. The latter step; namely, the addition of water and its removal by boiling, may be repeated until the mercury has been reduced to an acceptable value, preferably to no more than 0.01 p.p.m. The addition of the reducing agent may be made before the solution is heated to a boil, after it is heated to a boil or after one or more of the boiling cycles. Preferably, it is added before the first boiling cycle.

When a gas such as nitrogen or air is used, additional water need not be added at first. During or after the volatilization step, however, it may be found desirable to readjust the concentration of the caustic solution to its original value, since the gas, unless presaturated with water, will concentrate the solution to some degree. The caustic solution should be heated above 20° C. and preferably, to between 50° C. and the boiling point. The reducing agent may be added before passage of the gas through the solution is begun, but as previously stated, the point in the procedure where it is added is not critical.

Referring to the drawing, the flow sheet diagrammatically illustrates one method of carrying out the present invention. Filtered caustic soda or potash solution generally having a concentration of from 35 to 55% obtained from the electrolytic decomposition of brine, and containing mercury as an impurity (generally ranging from about 0.3 to 4.0 p.p.m.), enters through line 1 into caustic mix/ hold tank designated by numeral 2. The reducing agent is introduced through line 3 into reagent mix tank 4 which is also supplied with process water through line 5. The water and reducing agent are mixed to form an aqueous solution, the concentration of which may vary within a wide range of the order of 5 to 40%. The concentration is not critical since only small quantities of reagent relative to the amount of caustic are employed. After the caustic solution and reagent are mixed in tank 2, the mixture is discharged through line 6 on through vapor condenser/caustic preheater 7 wherein it passes in indirect heat exchange with vapors entering through line 8 from stripping column 9. A preheated caustic solution at a temperature generally about 35 to 90° C. dependent on the rate of flow and the temperature of the vapor, then flows down through line 10 and through caustic heater 11. The caustic is further heated in caustic heater 11 by indirect heat exchange with superheated steam entering through line 12 and discharging through line 13, thereby heating the caustic solution to a stripping temperature corresponding to about its boiling point. The thus heated aqueous caustic solution at a temperature close to its boiling point (140° C. for 50% NaOH) is introduced through line 14 to the top of stripping column 9 which may be of any conventional packed column type containing Raschig rings, brick work, Berl saddles, or the like.

Steam is introduced through line 16 at about 165 p.s.i.g. into the bottom of stripping column 9 and passes upwardly in direct contact with the downflowing aqueous caustic solution, thereby effecting the stripping of mercury from the caustic solution. The purified caustic solution containing as low as 0.0% mercury is discharged to storage through line 17.

Vapors released from the top of stripping column 9 at about 3 p.s.i.g. and containing mercury, generally in vapor phase, stripped from the caustic solution, passes through line 8 in indirect heat exchange with the incoming caustic solution entering at ambient temperature and passing through vapor condenser caustic preheater 7. The partially condensed vapor and/or condensate discharges through line 18 into condensate cooler 19 wherein it is cooled by indirect heat exchange with cold water entering through line 21 and discharging through line 22. The cooled condensate from condensate cooler 19 is discharged through line 23. Non-condensible gases, if any, are released through line 24.

In the preferred method of operation, the cooled condensate discharged through line 23, which contains the mercury removed from the caustic solution, is transferred to the sodium amalgam decomposer, which is a conventional unit employed in the electrolytic processing of brine, employing mercury cathodes, to produce caustic solutions and chlorine. In this way, the mercury remains within the operating cycle.

Another method applicable to the removal of the mercury contaminant in caustic solutions comprises scrubbing the exit gas or vapor with chlorinated spent brine which is then returned to the conventional brine circuit of an electrolytic mercury cell process.

Although reference has been made primarily to the treatment of relatively high concentrations of caustic solutions such as those obtained directly from the operation of electrolytic mercury cells, the method is also applicable to the removal of mercury contained in weak caustic solutions and effluents.

EXAMPLE 1

To demonstrate the volatilization of mercury with nitrogen, 250 milliliters of a mercury contaminated 50% caustic soda solution is heated to 80° C. Nitrogen is vigorously bubbled through the solution for 30 minutes, using a fritted glass tube as a sparger. The solution originally contained 1 part per million (p.p.m.) of mercury. After the treatment with nitrogen, the solution contains 0.8 p.p.m. of mercury, demonstrating an appreciable decrease in the mercury content. In this example and those to follow, Hg determinations are made by taking a gram or less of the solution as a test sample, oxidizing the Hg to $Hg^{++}$ by first adding $KMnO_4$ followed by acidification with nitric or sulfuric acid, followed by destruction of the $KMnO_4$ with $NH_2OH \cdot HCl$ followed by reduction of the Hg to elemental form with $SnCl_2$ followed by passing an air stream through the treated sample, and then passing the air stream carrying the mercury, vapor phase, into the absorption cell of a vapor-atomic absorption flameless spectrophotometer.

EXAMPLE 2

To demonstrate the volatilization of mercury with water vapor formed in situ, 75 milliliters of water are added to 250 milliliters of a 50% caustic soda solution. The resulting solution is heated to boiling at atmospheric pressure. Boiling is continued until the added water has been volatilized. The caustic soda solution originally contained 1 p.p.m. of mercury. After the treatment described, the caustic soda solution is found to contain 0.1 p.p.m. of mercury.

EXAMPLE 3

The following example is carried out to demonstrate the fact that there is a practical limit to the amount of mercury that can be volatilized from a caustic solution by the employment of water vapor when no reducing agent is employed. A 50% caustic soda solution is subjected to successive operations in which 10% by weight of water is added, the solution is heated to boiling, the solution is boiled until the added water is volatilized and a sample is extracted for analysis.

The operation is repeated on the solution remaining after the preceding operation, thus the solution remaining after five operations will have been contacted with water vapor five successive times. The results are shown in Table I.

TABLE I

The effect of successive volatilizations on a caustic soda solution

|  | Mercury content, p.p.m. |
|---|---|
| Original solution | 1.0 |
| After first boiling cycle | 0.3 |
| After second boiling cycle | 0.2 |
| After third boiling cycle | 0.2 |
| After fourth boiling cycle | 0.1 |
| After fifth boiling cycle | 0.1 |

Table I demonstrates that there is a practical limit below which removal of the mercury by volatilization only, is ineffective. It also shows that volatilization alone may decrease the mercury content of caustic soda solutions to at least 0.1 p.p.m. of mercury.

EXAMPLE 4

The example which follows demonstrates the volatilizing effect on mercury, of water vapor (steam), in the presence of small amounts of various reducing agents, both organic and inorganic. 300 milliliters of water is added to 1,000 milliliters of the same 50% caustic soda solution used in Examples 1–3 above. The resulting solution is heated to boiling at atmospheric pressure. Boiling is continued until the 300 milliliters of additional water is removed. The caustic soda solution originally contained 1 p.p.m. of mercury. After the above treatment, it contained 0.1 p.p.m. of mercury.

The caustic soda solution containing 0.1 p.p.m. of mercury is then treated as follows: 30 milliliters of water and 0.1 gram of a reducing agent is added to 100 milliliters of the caustic soda solution. The mixture is heated to boiling at atmospheric pressure. Boiling is continued until the added water has been vaporized. This is done with ten different reducing agents. The results of these experiments are shown in Table II.

TABLE II.—EFFECT OF REDUCING AGENTS ON THE VOLATILITY OF MERCURY IN 50% CAUSTIC SODA

| Reducing agent | | Mercury remaining after treatment, p.p.m |
|---|---|---|
| Name | Empirical formula | |
| Hydroquinone | $C_6H_4(OH)_2$ | 0.07 |
| Stannous chloride | $SnCl_2 \cdot 2H_2O$ | 0.03 |
| Hydroxylamine hydrochloride | $NH_2OH \cdot HCl$ | 0.02 |
| Sodium sulfite | $Na_2SO_3$ | 0.04 |
| Sodium thiosulfate | $Na_2S_2O_3 \cdot 5H_2O$ | 0.05 |
| Ascorbic acid | $C_6H_8O_6$ | 0.04 |
| Triethanolamine | $C_6H_{15}NO_3$ | 0.04 |
| Formaldehyde | $CH_2O$ | 0.04 |
| Sucrose | $C_{12}H_{22}O_{11}$ | 0.03 |
| Sodium hypophosphite | $NaH_2PO_2 \cdot H_2O$ | 0.03 |

The results shown in Table II demonstrate that the addition of the reducing agent combined with volatilization is a more effective method of removing mercury than volatilization alone. The difference is particularly striking when these results are compared with those shown in Table I, in which successive volatilizations fail to reduce the mercury content of the same caustic solution below 0.1 p.p.m. Using a reducing agent, values as low as 0.02 p.p.m. of mercury are obtained.

The reducing agent which may be used is not limited to those selected for this example. These were selected merely to illustrate the principle. Neither is the quantity of reducing agent used meant to be a limit. It is preferred that the reducing agent used be within the range of 0.01 to 0.20 wt. percent, based on the weight of the caustic solution being treated. Furthermore, the reducing agent may be added at any stage in the volatilization process. This is illustrated in the following example.

EXAMPLE 5

The procedure followed here is the same as that in Example 2 with three exceptions:

(a) Only 20% by weight of water is added to the caustic soda solution.
(b) The reducing agent chosen is sodium sulfite.
(c) The solutions are cycled and boiled four rather than five times.

The data are shown in Table III. They demonstrate that the point in the process at which the reducing agent is added is not at all critical. Solutions V-A and V-B are identical. The only difference is the stage at which the sodium sulfite is added. The sodium sulfite is added to V-A before boiling. It is added to V-B after boiling once. In each case, the mercury level becomes constant after the third boiling cycle.

TABLE III.—REDUCING AGENT ADDITION

|  | Solution V-A ($Na_2SO_3$ added before 1st boiling cycle) Hg content, p.p.m. | Solution V-A ($Na_2SO_3$ added after 1st boiling cycle) Hg content, p.p.m. |
|---|---|---|
| Original solution | 2.0 | 2.0 |
| Hg analysis after first boiling cycle | 0.2 | 0.1 |
| Hg analysis after second boiling cycle | 0.03 | 0.02 |
| Hg analysis after third boiling cycle | 0.01 | 0.01 |
| Hg analysis after fourth boiling cycle | 0.01 | 0.01 |

The results shown in Table III demonstrate that the point at which the reducing agent is added is essentially immaterial. Also, the final mercury content is at least an order of magnitude lower than the result obtained with any known commercial process.

The examples cited above were confined to the treatment of caustic soda solutions. The same procedures are, however, equally applicable to caustic potash solutions. When inorganic reducing agents are used, the cation of the reducing agent should preferably correspond to that of the caustic solution being treated.

EXAMPLE 6

This example is designed to demonstrate the removal of mercury from caustic potash solutions by volatilization, using water vapor. 300 milliliters of water is added to 1,000 milliliters of 45% caustic potash. The solution is heated to boiling at atmospheric pressure. Boiling is continued until the 300 milliliters of added water is removed. The original caustic potash solution contains 0.3 p.p.m. of mercury. After the above treatment, the caustic potash solution contains 0.04 p.p.m. of mercury. Roughly, a tenfold decrease in mercury content is achieved in the operation.

The use of reducing agents may be applied to caustic potash solutions as it was applied to caustic soda solutions.

EXAMPLE 7

This example clearly demonstrates the value of reducing agents, used in combination with the volatilization procedure, in further reducing the level of contaminating mercury in caustic potash solutions. The solution containing 45% caustic potash and 0.04 p.p.m. of mercury is further treated with one of four reducing agents as shown in Table IV. Thirty milliliters of water are added to 100 milliliters of caustic potash solution. The resulting solution is then heated to boiling at atmospheric pressure.

Boiling is maintained until the water added has been volatilized. The results are shown in Table IV.

TABLE IV.—EFFECT OF REDUCING AGENTS ON THE VOLATILITY OF MERCURY IN 45% CAUSTIC POTASH

| Reducing agent | | Mercury remaining after treatment, p.p.m. |
|---|---|---|
| Name | Empirical formula | |
| Sodium sulfite | $Na_2SO_3$ | 0.01 |
| Sodium thiosulfate | $Na_2S_2O_3 \cdot 5H_2O$ | 0.01 |
| Potassium sulfite | $K_2SO_3 \cdot 2H_2O$ | 0.03 |
| Potassium thiosulfate | $3K_2S_2O_3 \cdot 5H_2O$ | 0.03 |

The data shown in Table IV demonstrate that addition of a reducing agent in addition to volatilization is superior to volatilization alone. This is the same as the findings in the case of caustic soda solutions as cited in Example III. We prefer the potassium salts over the sodium salts because they do not introduce sodium ions as a contaminate.

Although several variations in the method of carrying out the present disclosure have been given for purposes of illustration, it will be evident that various changes and modifications may be made therein without departing from the spirit and scope of this invention.

We claim:
1. A method for removing mercury from an aqueous caustic solution containing mercury as an impurity which consists essentially in vaporizing the mercury in the aqueous caustic solution by passing a gas or vapor through said solution maintained at a temperature above 20° C. and up to the boiling point of said solution, said aqueous solution containing a reducing agent in an amount sufficient to reduce the mercury to its elemental state, said vaporization being conducted for a period of time sufficient to reduce the mercury content of said solution to less than about 0.01 to 0.05 p.p.m. mercury.

2. A method as in claim 1 wherein the mercury removed from the caustic solution is directed to a sodium amalgam decomposer unit of a process for the electrolytic decomposition of brine, employing mercury cathodes.

3. The method of claim 1 wherein the mercury removed from the caustic solution is passed in intimate contact with chlorinated brine and the chlorinated brine containing the mercury is directed to an electrolytic cell for the decomposition of brine, employing mercury cathodes.

4. The method of claim 1 wherein the temperature of the caustic solution is maintained between 50° C. and its boiling point.

5. The process as claimed in claim 1 wherein the vapor is generated in situ by the application of heat, to cause some of the water to vaporize.

6. The process as claimed in claim 1 wherein steam is introduced into the body of the solution to effect removal of the mercury.

7. The method of claim 1 wherein the caustic solution is caustic soda having at the outset a concentration of about 40 to 55%.

8. The method of claim 1 wherein the caustic solution is caustic potash having at the outset a concentration of about 35 to 50%.

9. The method of claim 1 wherein the amount of reducing agent added is between 0.01 and 0.20% by weight of the caustic solution.

10. The method of claim 1 wherein the reducing agent is an inorganic reducing agent.

11. The method of claim 10 wherein the reducing agent chosen carries a cation corresponding to the cation of the caustic solution being treated.

12. The method of claim 1 wherein water is added to the solution after the volatilization step to restore it to its original concentration.

13. A method for removing mercury from an aqueous caustic solution containing the same as an impurity which comprises:
 (a) adding an amount of water equal to between 5 and 100% of the weight of the solution,
 (b) bringing the diluted solution to a boil,
 (c) adding between about 0.01 to 0.20 weight percent of reducing agent,
 (d) boiling the solution down to about its original volume, and
 (e) adding more water and repeating the boiling cycle until the mercury contaminate has been reduced to less than about 0.01 to 0.05 p.p.m.

14. The method of claim 13 wherein the amount of water added before each boiling cycle lies between 5 and 25% by weight of the caustic solution.

15. A continuous method for removing mercury from an aqueous caustic solution containing the same as an impurity which comprises:
 (a) continuously adding a reducing agent to the caustic solution,
 (b) passing the caustic and contained reducing agent into a column, countercurrent to a flow of vapor or gas,
 (c) releasing the gas, water vapor and contaminating mercury from the column,
 (d) continuously adding water to make up water losses due to vaporization, and
 (e) continuously withdrawing caustic solution substantially free of mercury from the column.

16. The method of claim 15 wherein the column is maintained at the boiling point of the caustic solution so that the gas or vapor is water vapor formed in situ.

References Cited

UNITED STATES PATENTS

| | | | |
|---|---|---|---|
| 3,029,143 | 4/1962 | Karpiuk et al. | 75—121 X |
| 3,115,389 | 12/1963 | Deriaz | 204—99 X |
| 3,600,285 | 8/1971 | Botwick | 204—99 |
| 3,647,359 | 3/1972 | Bell | 204—99 X |

FOREIGN PATENTS

| | | | |
|---|---|---|---|
| 57,111 | 8/1967 | Germany | 204—99 |

JOHN H. MACK, Primary Examiner

D. R. VALENTINE, Assistant Examiner

U.S. Cl. X.R.

55—53, 72; 175—121; 423—210